Sept. 23, 1958 R. R. DUSSINE 2,853,234

ELECTRONIC DIGITAL ADDER-SUBTRACTORS

Filed March 14, 1952

2 Sheets-Sheet 1

INVENTOR.
ROGER ROBERT DUSSIN
BY Theodore Hafner
ATTORNEY

Sept. 23, 1958 R. R. DUSSINE 2,853,234

ELECTRONIC DIGITAL ADDER-SUBTRACTORS

Filed March 14, 1952 2 Sheets-Sheet 2

INVENTOR.
ROGER ROBERT DUSSINE
BY Theodore [illegible]
ATTORNEY 2,853,234

ELECTRONIC DIGITAL ADDER-SUBTRACTORS

Roger Robert Dussine, Paris, France, assignor to Societe d'Electronique et d'Automatisme, Courbevoie, France Application March 14, 1952, Serial No. 276,601

Claims priority, application France March 29, 1951

10 Claims. (Cl. 235—61)

This invention relates to electric devices for adding and subtracting two numerical or quantified items of information (herein called "numerical quantity") previously encoded in such a manner that each numerical quantity is represented by an electric signal in the form of an impulse train reproducing the binary-scale expansion of the numerical quantity into a series of the form $$a_0+2a_1+2^2a_2+ \ . \ . \ . \ +2^na_n$$

in that the successive impulse moments of the train in their order of occurrence respectively denote the terms of this series read from left to right, i. e. in the sequence of increasing orders 0, 1, 2, . . . $n$ or powers 1, 2, $2^2$ . . . $2^n$ of these terms, while the absence or presence of an impulse in any one of the impulse period of the train denotes the value (which can only be either 0 or 1) of the coefficient or digit $a$ of the particular term denoted by that impulse period. Adding and subtracting devices of this kind will hereinafter be called "of the kind specified."

The object of the invention is to provide an improved digital electric adding and subtracting device, operating by means of coded impulse trains and which effects all carry-over corrections concurrently with the operations of adding and subtracting individual digits of these trains so that, when two coded trains are applied to the device, the latter in adding or subtracting their impulses, automatically produces a coded impulse train representing the carries and another coded impulse trains, which will be referred to as the output train and represents the corrected result of the whole process of addition or subtraction of the two numerical quantities represented by the input coded trains.

An electric adding and subtracting device of the kind specified comprises an impulse counter consisting of two cascade-connected scale-of-two trigger circuit stages, each having two stable conditions, a rest condition (binary digit 0) and an actuated condition (binary digit 1), the counter being adapted to have resetting impulses periodically applied to a reset input of both scale-of-two stages which are thereby reset to the rest condition, a return channel so coupling the output of the second scale-of-two stage to the trigger input of the first scale-of-two stage that a carry-over impulse is applied to the latter as a result of the second scale-of-two stage having been placed in the actuated condition, the return channel containing delay means, and input terminals for introducing the two coded input trains which respectively represent the two numerical quantities to be combined in such a manner that the appearance of an impulse period of one of the coded trains at the trigger input of the first scale-of-two stage occurs in phase-displaced relation to the appearance thereat of the corresponding impulse period of the other coded train and that the appearance thereat of each of two corresponding impulse period of the two coded trains respectively occurs in phase-displaced relation to the appearance thereat of any carry-over impulse from the output of the second scale-of-two stage, and a gating stage an input of which is connected to the output of the first scale-of-two stage, while another input of the gating stage is adapted to have reading impulses periodically applied thereto to read the condition of the first scale-of-two stage in such a manner that an impulse appears in the output channel only when the first scale-of-two stage has been placed in the actuated condition, the reading impulses having the same recurrence as the impulse period of the two coded input trains and as the resetting impulses, but each reading impulse appearing at the gating stage input with a phase-lead relatively to the appearance of the resetting impulses at the reset input of the two scale-of-two stages and with a phase-lag relatively to the appearance of the phase-displaced pair of corresponding impulse moments of the two coded input trains and/or any carry-over impulse at the trigger input of the first scale-of-two stage while the resetting impulse in turn appears at the reset input of the two scale-of-two stages with a phase-lead relatively to the appearance of the phase-displaced pair of corresponding impulse periods of the two coded trains and/or any carry-over impulse at the trigger input of the first scale-of-two stage.

According to the present invention, in such a device, there is provided a gating stage having its output connected to the trigger input of the second scale-of-two and having one input connected to the output of the first scale-of-two stage, another input of said gating stage receiving a series of reading impulses periodically applied thereto to read within each impulse period the condition of the first scale-of-two stage the impulse moments of the two before the appearance at the trigger input of said first scale-of-two stage of any impulse in each impulse period of the input coded train representing the augend or the minuend quantity, as the case may be, and said reading input of said gating stage includes a further gating stage receiving on one input said reading impulses and having its output connected to the reading input of said gating stage, and having another input receiving a signal to render said reading impulses inoperative when an operation of addition is to be performed and to render said reading impulses operative on said gating stage when an operaation of subtraction is to be performed.

In order to enable the invention to be carried into effect, reference will be made to the accompanying drawings, in which.

Figure 1:
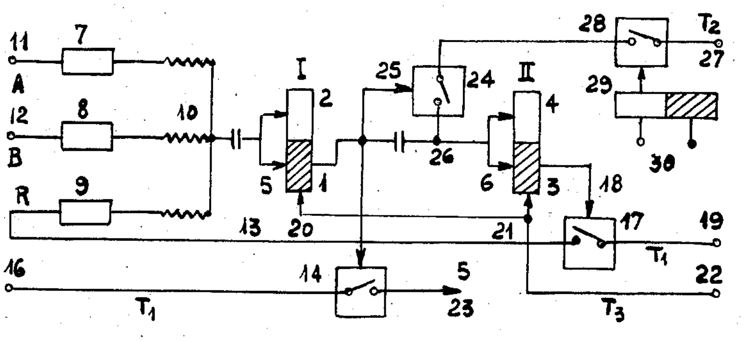
Fig. 1 shows in block-schematic form the basic constitution of an adding and subtracting device according to the invention.

Referring first to Fig. 1, the device shown therein comprises an impulse counter consisting of two cascade-connected bi-stable scale-of-two trigger stages I and II, each being for example of the flip-flop trigger circuit type with two electron discharge tubes having their control grids and plates reciprocally coupled by time-constant networks, the two tubes being indicated in the block-schematic circuit by the two squares respectively which make up each of the blocks representing the stages respectively I or II. To distinguish the two stable conditions of each scale-of-two stage, one is referred to herein as the rest condition and the other as the actuated condition, or work condition. In Fig. 1, both scale-of-two stages I and II are shown in the rest condition (indicative of the binary digit 0) in which the lower tube, 1 or 3, is conductive or "on" (denoted by cross-hatching) and the upper tube, 2 or 4, is non-conductive or "off"; in the actuated condition (indicative of the binary digit 1), the upper tube is "off" and the lower tube in "on."

The scale-of-two stages I and II are provided with symmetrical trigger inputs 5 and 6 respectively so that any incoming pulse of preferably negative polarity, when applied on the trigger input of either stage will trigger that stage from one condition to the other by turning off the tube thereof which was on and reciprocal. Those inputs are impulse inputs as indicated by the condensers shown in series therewith.

The input circuit of the device comprises three delay channels 7—8—9 leading to an input mixer 10 which is shown in Fig. 1 as a resistance mixer. The channel 7 receives the input coded train A on its terminal 11, for instance, the input channel 8 receives the coded train B on its terminal 12 and the channel 9 receives the impulse train of carry-over impulses R through the carry channel 13. The delay times will be later specified. The input coded train B represents the numerical quantity to be added to or subtracted from the numerical quantity represented by the input coded train A.

The plate of the tube 1 of the first scale-of-two stage I is connected by a capacitive coupling circuit to the symmetrical trigger input 6 of the second scale-of-two stage II, and also controls by a branch D. C. connection the condition of conductivity of a gating stage 14. Said stage 14 is condition non-conductive or "off" condition (symbolically indicated in Fig. 1 by an open switch) when the scale-of-two stage I is in the rest condition, said gating stage being rendered conductive or "turned on" when the scale-of-two stage I is placed in its actuated condition. Said gating stage 14 receives on its input terminal 16 a series of reading impulses $T_1$ periodically applied thereto.

Similarly, the plate output of the tube 3 in the scale-of-two stage II controls the condition of conductivity of a gating stage 17 through a branch D. C. connection 18. On its input terminal 19, said gating stage 17 also receives the same periodical series of reading impulses $T_1$.

The counter is provided with a resetting circuit having a common input terminal 22 by which resetting impulses are periodically applied to reset inputs 20 and 21 of the stages I and II respectively, thereby restoring to the rest condition any scale-of-two stage which is at that time in the actuated condition.

The duration of any impulse period of the various coded impulse trains will be denoted $\theta$. A train having an impulse in every impulse period would be of regular periodicity with the impulses spaced apart by equal time intervals $\theta$. The reading impulse $T_1$ is of regular periodicity and is applied with the series of a phase-lag of $4\theta/6$ relatively to the phase of the input coded trains A and B at the terminals 11 and 12 respectively. The delay imposed in the input channel 9 is equal to $2\theta/6$ so that a carry-over impulse R will be present at the symmetrical input trigger 5 of the scale-of-two stage I at each zero instant of the impulse period following the one during which a reading impulse $T_1$ was transmitted through the gating stage 17, when conductive or "on," since such reading impulse was applied at the instant $4\theta/6$ of the preceding pulse period.

The delay in the input channel 8 is taken equal to $\theta/6$ so that any impulse in the input coded train B will be displaced by $\theta/6$ at the trigger input 5 on the zero instant of each impulse period of code.

As an alternative, and without changing the overall operation of the device shown in Fig. 1, it is also possible not to delay the impulses of the input coded train B—delay time equal to zero in the input channel 8—but to provide a delay of $3\theta/6$ in the input channel 9 for the carry-over impulses. It is quite immaterial that the impulses of the input coded train B reach the trigger input 5 of the scale-of-two stage I before or after the carry-over impulses but no impulse of the input coded train A must be allowed to reach trigger input 5 between the instants of application thereto in any one impulse period, of an impulse coded train B and of a carry-over impulse R.

The input coded train A is delayed by $\theta/2$ in the input channel 7, and said delay may be varied provided it remains lower than $4\theta/6$ so that its pulses will appear at 5 before instants of application of the reading impulse $T_1$ in the described embodiment.

The application of a periodical resetting impulse $T_3$ to the input terminal 22 is the last occurrence in each impulse period. By way of example, the resetting impulses $T_3$ will be applied at the instant $5\theta/6$ of each impulse period.

With the arrangement so far described, the device will operate as an added of the two numerical quantities represented by the two input coded trains A and B. Such an operation will now be explained with reference to an illustrative example shown in Fig. 2, wherein the impulse periods are indicated from top to bottom in the time sequence of their increasing orders or powers, viz. 1—2—4—8—16—32—64.

The column A indicates the code impulses of the numerical quantity 53 and the column B the code impulses of the numerical quantity 27. The column $S_a$ indicates the output coded train resulting from an addition operation between said two numerical quantities and thus presents the code impulses of the numerical quantity 80=53+27. Said code impulses are, for the trains A, B, $R_a$ and $S_a$ (carry-over and output for an addition operation) indicated at their instants of application on the actuation input 5 for the three first trains and to the output channel for the last one. The impulses $T_1$ and $T_3$ are indicated at their instants of application upon the terminals 16, 19 and 22, respectively, and further are indicated on the one and the other side of their axis so as to indicate their direction of efficiency.

If required, the output pulses S may be further delayed by $2\theta/6$ so that the output train have its impulse periods of code in a phase-displacement by $\theta$ with respect to the impulse periods of the input trains A and B at the terminals 11 and 12.

When the coded input trains are applied in phase with each other to the inputs 11 and 12 of the device, the first impulse in the input coded train B, at the first impulse period, triggers to its actuated condition the first scale-of-two stage I and the first impulse in the input coded train A, in this same impulse period, resets stage I to rest, thus actuating to work the second trigger stage II. The tube 1 being conductive, the gating stage 14 is non-conductive and, the tube 3 being off, the gating stage 17 is conductive. The reading impulse $T_1$ in said first impulse period passes through said gating stage 17 and a carry-over impulse is delivered to the lead 13 and the delayed channel 9, which reaches the actuation input 5 of the first scale-of-two stage I at the zero instant of the second impulse period and triggers said stage I to work. No output pulse is delivered in the first impulse period. Before the instant when the carry-over impulse $R_a$ reaches the actuation input 5, the scale-of-two stage II has been reset to its rest condition by the resetting impulse $T_3$ in the first impulse period.

The impulse of the second impulse period in the input train B finds the stage I in its actuated condition, brings it back to its rest condition and thus actuates to work the second trigger stage II. As there is no impulse in the coded train A during said second impulse period, the reading impulse $T_1$ finds the gating stages in the same condition as in the first moment of code: a carry-over impulse is transmitted to the delayed channel 9 and reaches the actuation input 5 at the zero instant of the third impulse period.

During said third impulse period, the input train B does not present any impulse but an impulse exists in the input coded train A. The counter marks a count of two impulses and the reading impulse forms a carry-over impulse. In the fourth impulse moment of code, it is the impulse in the input coded train B which produces the same condition of the counter I—II with the same result.

During the fifth impulse period, on the other hand, the first scale-of-two stage I is put in its actuated condition by the carry-over impulse from the fourth impulse period, and the impulse of the input train B turns it back to rest and triggers the scale-of-two stage II to its actuated condition; but the impulse in the input coded train A actuates to work the scale-of-two stage I so that, at the instant of application of the reading impulses $T_1$, both stages I and II are in their actuated conditions, both gating stages 14 and 17 are rendered conductive and an output impulse is thus delivered as well as a carry-over impulse. During the sixth impulse period, a carry-over impulse is similarly generated and, during the seventh impulse period, the stage I is at work and the stage II, at rest when the reading impulse arrives and thus an output impulse alone is delivered.

Now, in order to make the above-described device suitable for use as a subtractor, the plate output of the tube 1 in the scale-of-two stage I also controls the condition of conductivity of an additional gating stage 24 through a D. C. connection 25. Said gating stage 24 is non-conductive when the stage I is at rest and conductive if said stage I is at work. The output 26 of the gating stage 24 is connected to the symmetrical trigger input 6 of the scale-of-two stage II. An input of the gating stage 24 is connected to an input terminal 27 which receives a series of periodical impulses $T_2$ which are applied with a phase lage of $\theta/3$ after the zero instant of the impulse period each impulse $T_2$ thus arrives on the gating stage 24 after any impulse in the coded trains B and R has appeared at the trigger input 5 of the first trigger stage I but before any impulse in the coded train A has appeared at the trigger input 5.

Of course the impulses $T_2$ are to be effective on the gating stage 24 only when the device is due to operate as a subtractor. Another gating stage 28, is therefore, inserted between the terminal 27 and the input of the gating stage 24 and said gating stage 28 is only rendered conductive when, by one of its inputs 29, it receives a control signal of voltage such as provided, for instance, from the plate output of a bistable trigger stage 30. Said trigger stage 30 is shown in the one of its two conditions in which it causes an operation of subtraction to be performed by the device, the gating stage 28 being then conductive and the impulses $T_2$ being transmitted from the terminal 27 to the input of the gating stage 24. In its other condition, said control trigger stage 30 renders the gating stage 28 non-conductive and said impulses $T_2$ cannot reach said input of the gating stage 24. Such a control trigger stage may be called a "sign control element."

Figure 2:
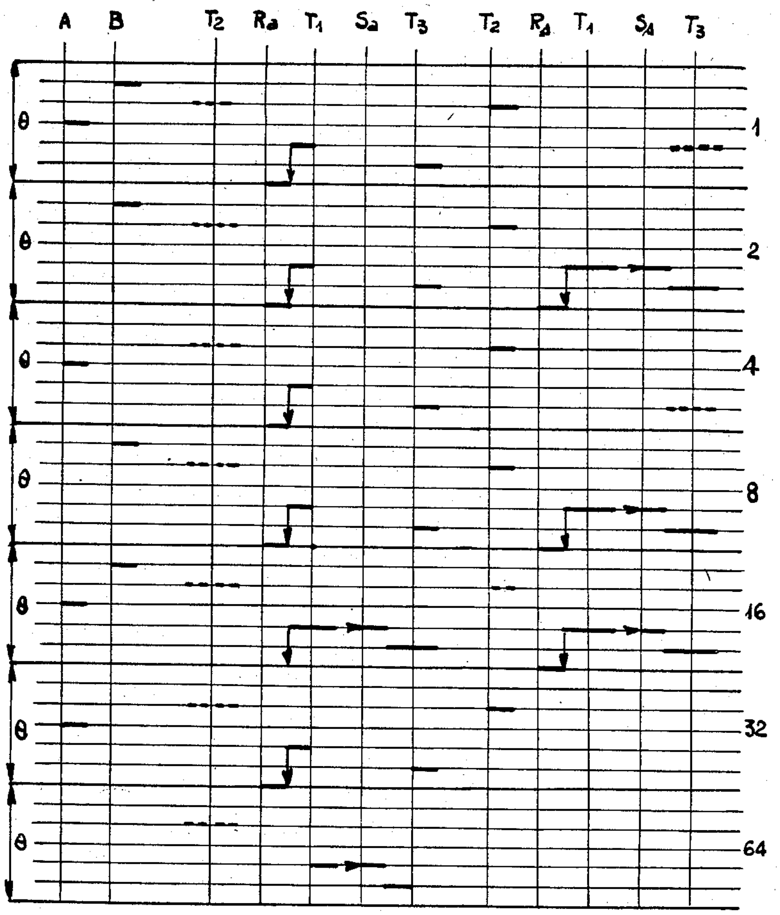
Fig. 2 is a diagram used to explain the operations of addition and subtraction performed with the device of Fig. 1, by a numerical example; and, Fig. 3 is a circuit diagram showing by way of example, a form of electronic lay-out for an adding and subtracting device embodying the invention.

A numerical example of operation of the device as a subtractor, with the stage 28 conductive, will now be described in relation to the right-hand portion of Fig. 2, for the same input coded trains A and B representing the numerical quantities 53 and 27. The output and carry-over columns for the subtraction are indicated at $S_s$ and $R_s$. The same symbolism is used as in the case of an adding operation.

At the first impulse period, the existing impulse of the input train B actuates to work the scale-of-two stage I, and the gating stage 24 is rendered conductive. The impulse $T_2$ in said impulse period thus actuates to work the second scale-of-two stage II. The impulse of the input train a resets to rest both the stages I and II and, when the $T_1$ impulse is applied to both the terminals 16 and 19, both the gating stages 14 and 17 are non-conductive. No output impulse is delivered and no carry-over impulse is formed.

During the second impulse period, the impulse of the input train B actuates the stage I and the impulse $T_2$ actuates the stage II. Both the gating stages 14 and 17 are then conductive and both an output and a carry-over impulse are delivered. The resetting impulse. The resets both stages I and II to their rest conditions. The carry-over impulse at the zero instant of the third impulse period of code actuates to work the first stage I. As no impulse exists in the input train B at said third impulse period, the gating stage 24 remains conductive, the impulse $T_2$ is transmitted and actuates to work the second stage II of the counter. But the impulse of the input train A arrives and sets back both the stages to rest before the instant of application of the reading impulses $T_1$ and no output and carry-over pulses are delivered.

During the fourth impulse period, the operation is similar to that which takes place during the second impulse moment, so that an output pulse and a carry-over pulse are generated. At the zero instant of the fifth impulse period, the scale-of-two stage I is then actuated to work. The impulse of the input train B resets said stage I to its rest condition and thus the gating stage 24 is not conductive at the instant of application of the impulse $T_2$. Then the impulse in the input train A actuates to work the first trigger stage I, and the gating stages 14 and 17 are rendered conductive at the instant of application of the reading impulses $T_1$ on their inputs; an output pulse is delivered as well as a carry-over pulse.

During the sixth impulse period, the carry-over impulse actuates to work the first trigger stage I, and the impulse $T_2$ actuates to work the second trigger stage II. Both said stages are reset to rest by the existing impulse of the input coded train A. No output and carry-over pulses are delivered and the operation is stopped.

The output coded train $S_s$ represents the binary scale expression of the numerical quantity 26, being the correct result of subtraction of 27 from 53.

For the operation of devices according to the invention it is apparent that, for a subtraction, the input coded train A must always represent a minuend numerical quantity which is greater than the input coded train representing the subtrahend.

Figure 3:
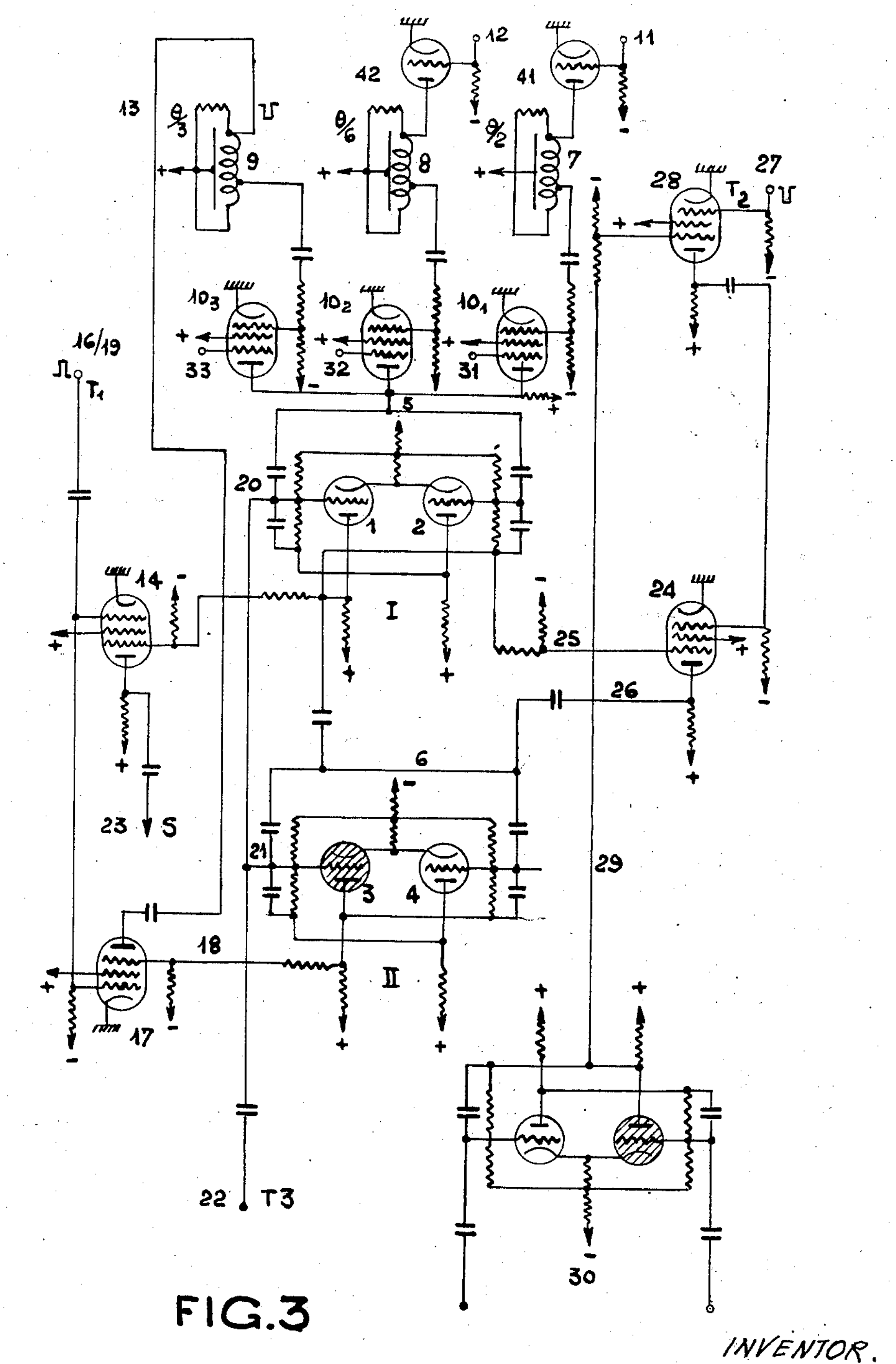

The component circuits indicated in the block-schematic diagram of Fig. 1 may be conventional elements. In order to give a better idea of such component circuits, an example of lay-out is given in Fig. 3. In said embodiment all the impulses are applied in positive polarity to their respective input terminals but for the impulses $T_2$ which are of negative polarity when applied at 27. Further, the periodical impulses $T_1$, $T_2$, $T_3$ are permanently supplied and additional impulses occurring at the first, second and fourth instants of each moment of code are also available, viz. from a general impulse distributor of the complete computer of which the adding and subtracting device forms part. These latter impulses are used for the reshaping of the waveforms of the impulses of the coded trains R, B and A, respectively. Such a reshaping will become useless if the impulses in said coded trains are already properly shaped.

The input terminals 11 and 12, through inverter stages 41 and 42, and the carry lead 13, are connected to the input taps of respective delay lines 7, 8 and 9. These delay lines, are of the electromagnetic artificial network type and, are terminated at one end on their characteristic impedance and at their other end on a short-circuit, the output taps being provided at intermediate points along the lines such that at these output taps it appears two pulses of opposite polarity because of the reflection of the input impulse from the terminating short-circuit, the positive portion of said "curbed" impulse appearing at the output tap at the required instants viz., $\theta/2$ for the delay line 7, $\theta/6$ for the delay line 8 and $\theta/3$ for the delay line 9. In addition to the polarity reversal thus obtained, it is to be noted that such a delay line arrangement avoids all need for D. C. restoration at the output of each delay line.

The output taps of said delay lines are respectively connected to the control grids of three reshaping stages $10_1$, $10_2$ and $10_3$ through the well-known reshaping process wherein such tubes are only rendered conductive during the intervals of application of well-formed impulses on their suppressor grids, in positive polarity so as to counteract a too low bias (not indicated). Such reshaping impulses are applied at the instant $\theta/2$ of any and all impulse moments on the terminal 31 for the reshaping tube $10_1$, at the instant $\theta/6$ on the terminal 32 for reshaping tube $10_2$ and at the instant $\theta/3$ on the terminal 33 for the third reshaping tube $10_3$.

Each scale-of-two trigger stage I and II of the impulse counter is a conventional flip-flop or Eccles-Jordan stage; multigrid tubes, such as pentode tubes, may be used instead of triode tubes.

Each of the gating stages 14, 17 and 24 may comprise three-grid tube receiving the reading impulses on its control grid and having their third grids, or suppressor grids, respectively connected through potential divider networks to the plate of the tube 1, for the gating stages 14 and 24, and to the plate of the tube 3, for the gating stage 17. These connections, ensure that the gating tubes are conductive only when the tube 1 and 3, as the case may be is "off" in the actuated condition of the scale-of-two trigger stage concerned.

The application of the reading impulses $T_2$ to the tube 24 is under the control of an input tube 28 which is rendered conductive only when the device is required to act as a subtractor, and non-conductive when said device is required to act as an adder. The condition of the tube 28 could be controlled by the actuation of a switch in its plate connection to the battery supply. However, in the embodiment of Fig. 3, the condition of the control tube 28 depends on whether the trigger stage 30 is of its stable conditions or in the other one. The bistable trigger stage 30 is also shown as a conventional flip-flop circuit and a D. C. connection from the plate of one of its component tube to the suppressor grid of the tube 28 renders the latter non-conductive when said trigger stage is in the shown condition, and the device then acts as an adder circuit.

What I claim is:

1. In an electronic computer device, the combination of a counter consisting of two cascade-connected scale-of-two trigger stages, each having a rest condition representing the binary digital values zero and an actuated condition representing the binary digital values 1 and both having a reset input for the simultaneous application of periodical resetting impulses, three delay channels connected in parallel to the trigger input of the first trigger stage for actuating said first trigger stage by relatively phase-displaced coded pulse trains, each channel having a separate input terminal for a pulse train, a pair of gating stages operatively controlled from the actuated condition of the first trigger stage, one of them having its output connected to a trigger input of the second trigger stage and the other having its output connected to an output channel, a gating stage operatively controlled from the actuated condition of the second trigger stage, said gating stage having its output connected to one of said delay branches in the first stage actuation channel, said gating stage and the one of the pair having its output connected to said output channel having actuation inputs for the simultaneous application of periodical reading impulses, and the other gating stage of the pair having an input for the application of periodical reading impulses occurring in phase-displaced relation between the impulse moments of code of the two input coded trains respectively applied to the separate input terminals of the two branches in said three branch actuation channel not connected to the output of the said one gating stage of the pair.

2. In the combination according to claim 1, the provision in the input reading channel for the gating stage of the pair having its output connected to the trigger input of said second scale-of-two trigger stage in the counter, of an additional gating stage operatively controlled by a voltage signal representative of the sign of the algebraic operation to be performed between the numerical quantities represented by the two input coded trains.

3. An electronic computer for the combination of a subtrahend representative coded pulse train and a minuend representative coded pulse train comprising a counter consisting of two cascade-connected trigger stages and a carry-over coupling circuit from the output of the second trigger stage to the trigger actuation input of the first, said coupling circuit including means for deriving a carry-over pulse train, the cascade connection including means under control of the output of the first trigger stage to inject additional timing pulses into the input of the second trigger stage, and in which pulses are present at the moments of code in which said second trigger stage is in its actuated condition, means for coupling subtrahend, minuend and carryover pulse trains to the input of the first trigger stage including means for phase-displacing an incoming subtrahend pulse train, said carry-over pulse train and an incoming minuend pulse train so that the trigger input of the first trigger stage in said counter receives first the pulses in said subtrahend and carry-over trains prior to the pulses in said minuend train, means for actuating from its rest to its actuated condition said second trigger stage each time a single pulse exists in both the subtrahend and carry-over pulse trains, and means for gating timing pulses so controlled from the first trigger stage as to be conductive when each time the first trigger stage is in its actuated condition after reception of the pulses in a pulse period from said three pulse trains whereby an output pulse train is derived.

4. In an electronic computer device, two cascade-connected scale-of-two trigger stages forming a counter, each having a rest condition corresponding to binary digital values zero and an actuated condition coresponding to binary digital values one and both having a reset input for the simultaneous application of periodical resetting impulses, a plurality of delaying circuits for actuating respectively the first trigger stage by relatively phase-displaced coded pulse trains, three gating stages, two of them being controlled by a predetermined condition of the first trigger stage and the third one by a predetermined condition of the second trigger stage, and having outputs connected, respectively, to an input of the second trigger stage, to an output channel, and to one of said delaying circuits; and means for deriving the latter two outputs from the simultaneous application of periodical reading pulses, and the first mentioned output from the application of periodical reading pulses occurring in phase-displaced relation between the two input code trains respectively applied to the two other delaying circuits.

5. In an electronic computer for the selective combination by addition and subtraction of two number representative pulse trains, a selectively operable timing pulse channel, two trigger stages, gating means under control of the output of a first trigger connecting said timing pulse channel to the input of a second trigger stage, means for coupling an output of said second trigger stage to an input of the first stage; said coupling means including means for deriving a carryover pulse train representing a predetermined position of said second trigger stage, means for coupling said number representative pulse trains and said carryover pulse trains to the input of said first trigger stage including means for delaying one of said number representative pulse train with respect to the other, and said carryover pulse train, a source of output pulses, and other gating means for deriving an output pulse train from said source under control of an output of said first trigger stage.

6. Computer according to claim 5 wherein case of subtraction said delaying means include means for phase displacing an incoming subtrahend pulse train, said carryover pulse train and an incoming minuend pulse train so that the trigger input of the first trigger stage in said counter receives first the pulses in said subtrahend and carryover trains prior to the pulses in said minuend train.

7. Computer according to claim 6 comprising means for actuating from its rest to its actuated condition said second trigger stage each time a single pulse exists in both the subtrahend and carryover pulse trains.

8. Computer according to claim 5 comprising means for deriving an output pulse train each time the first trigger stage is in its actuated condition after reception of the pulses in a pulse period from said three pulse trains at the input of the first trigger stage.

9. Computer according to claim 5 wherein said coupling means include means for deriving a carryover pulse train in which pulses are present at pulse periods in which said second trigger stage is in its actuated condition, means for actuating from its rest to its actuated condition said second trigger stage each time a single pulse exists in both the subtrahend and carryover pulse trains, whether said other gating means include means for deriving an output pulse train each time the first trigger stage is in its actuated condition after reception in a pulse period of pulses from said three pulse trains at the input of the first trigger stage.

10. In a binary adder for selective operation as a subtractor, the combination of a plural stage binary pulse circuit, sources of value-representing pulses, input means for applying said value representing pulses to the counting circuit, a normally blocked readout channel and a normally blocked sign controlled pulse channel connected to a higher order counting stage, a source of readout test pulses, a source of timing pulses, means for applying a readout test pulse to the readout channel, means for selectively applying timing pulses to said sign controlled pulse channel, and means controlled by the lowest order counting stage in response to the presence of a predetermined count in said stage for unblocking said readout and sign-controlled pulse channels.

References Cited in the file of this patent

UNITED STATES PATENTS

| | | |
|---|---|---|
| 2,590,950 | Eckert et al. | Apr. 1, 1952 |
| 2,812,903 | Knutsen | Nov. 12, 1957 |

OTHER REFERENCES

Proc. of the IRE, January 1952, "The Binac," by Overbach et al., pages 12 to 19.

Electronic Engineering, December 1950, "The Physical Realization of an Electronic Digital Computer," by Booth, pages 492 to 498.

Theory and Techniques for Design of Electronic Digital Computers, University of Pennsylvania, "Adders," lecture 23, by Eckert and Sheppard, June 30, 1948, 4 pages.

"High Speed Computing Devices," 1950, by Engineering Research, Associates, McGraw-Hill Book Co., Inc., pages 268 to 284.